United States Patent [19]

Kawada et al.

[11] Patent Number: 4,485,320
[45] Date of Patent: Nov. 27, 1984

[54] WELDED STATOR USING NON-MAGNETIC BARS IN SPECIALLY SHAPED LAMINATION SLOTS

[75] Inventors: Shigeki Kawada, Hino; Shigeaki Oyama, Hachioji; Kousei Nakamura; Jiro Nakano, both of Hino, all of Japan

[73] Assignee: Fanuc Ltd., Hino, Japan

[21] Appl. No.: 498,187

[22] PCT Filed: Sep. 8, 1982

[86] PCT No.: PCT/JP82/00360
§ 371 Date: May 6, 1983
§ 102(e) Date: May 6, 1983

[87] PCT Pub. No.: WO83/00953
PCT Pub. Date: Mar. 17, 1983

[30] Foreign Application Priority Data
Sep. 8, 1981 [JP] Japan .................... 56-140242

[51] Int. Cl.³ .................... H02K 1/16; H02K 1/18
[52] U.S. Cl. .................... 310/217; 310/42; 310/259
[58] Field of Search .............. 310/216, 217, 258, 259, 310/42, 254; 336/234

[56] References Cited
U.S. PATENT DOCUMENTS

| | | | |
|---|---|---|---|
| 2,393,065 | 1/1946 | Rose | 310/217 X |
| 2,556,013 | 6/1951 | Thomas | 310/217 UX |
| 2,610,225 | 9/1952 | Korski | 310/217 X |
| 2,790,918 | 4/1957 | Goran | 310/217 |
| 2,961,556 | 11/1960 | Vance | 310/216 |
| 3,533,867 | 10/1970 | Derzee | 310/217 X |

*Primary Examiner*—Mark O. Budd
*Attorney, Agent, or Firm*—Armstrong, Nikaido, Marmelstein & Kubovcik

[57] ABSTRACT

A stator of an electric motor comprises a laminated iron-core (1) having dovetail grooves, end plates (2) and steel bars (3) which are accommodated in the dovetail grooves and have a trapezoidal shape in cross-section. The steel bars (3) are arc-welded to the laminated iron-core (1) and to the end plates (2).

2 Claims, 2 Drawing Figures

WELDED STATOR USING NON-MAGNETIC BARS IN SPECIALLY SHAPED LAMINATION SLOTS

DESCRIPTION

TECHNICAL FIELD

The present invention relates to a stator, more particularly, to a stator comprising a laminated iron-core of a rotary machine such as an electric motor, and end plates and a frame which held the iron-core.

BACKGROUND ART

An electric motor generally comprises a rotor, stator, and casing. The stator comprises a laminated iron-core (laminated core of silicon steel plates) and end plates and a casing which fasten the laminated core. As the casing a cast casing provided with cooling fins is used. Miniaturization, direct iron-core cooling, and cost reduction considerations, however, have resulted in development of electric motors without cast casing and with exposed iron-cores. The elimination of cast casing and other casings, however, makes laminated iron-core susceptible to deformation by sliding of the laminated plates. Accordingly, it is necessary to provide a means for securely fastening a laminated iron-core. Methods of fastening include the method of boring holes through the laminating iron-core (laminated silicon steel plates) and of binding it with bolts and the method of making longitudinal grooves for welding in the outer periphery of the laminated iron-core and performing arc welding. In the former case, there is the danger of twisting of the laminated iron-core. In the latter case, there is the danger of unsecure joining of the steel plates constituting the laminated iron-core. Attempts have been made to securely fasten the laminated iron-core by forming square longitudinal grooves in its outer periphery, inserting square bars into the square grooves by, e.g., hammering, and then welding together the laminated iron-core and square bars. In this case, during the arc welding process, the still unwelded end portions of the square bars bend up and rise over the outer surface of the iron-core due to thermal deformation. This makes it necessary to remove the risen end portions of the square bars by machining. Furthermore, the weld strength of the weld zone including the machined portions of the square bar is thus lower than that of the weld zone including the rest of the square bar.

DISCLOSURE OF THE INVENTION

An object of the present invention is to prevent bending and rising due to thermal deformation during welding of a laminated iron-core of a stator with bars inserted into grooves formed in the iron-core.

Another object of the present invention is to provide a stator of an electric motor having an exposed laminated iron-core fastened securely without deformation.

The above-mentioned objects are attained by a stator comprising a laminated iron-core with windings, end plates parallel to the lamination planes of the iron-core, and a frame formed on the outer periphery of the iron-core. According to the present invention, the frame comprises steel bars having a trapezoidal shape in cross-section, dovetail grooves which accommodate the steel bars are formed in the laminated iron-core, and the steel bars and the laminated core and end plates are welded.

It is preferable that the cross-section of the steel bars be an equilateral trapezoid. It is also preferable to bevel the edges of the laminated iron-core at the dovetail grooves so as to form V-grooves for welding by the steel bars and the laminated iron-core.

There are at least two steel bars comprising the frame. It is preferable to arrange the steel bars symmetrically with respect to the center axis of the stator. Furthermore, it is preferable that the steel bars be made of non-magnetic steel, for example, stainless steel (SUS 304), in which no eddy current is generated.

BEST MODE FOR CARRYING OUT THE INVENTION

Figure 1:
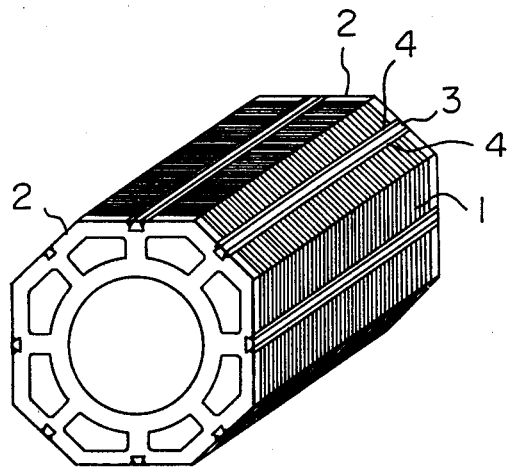
FIG. 1 is a schematic perspective view of a stator according to the present invention.
Figure 2:
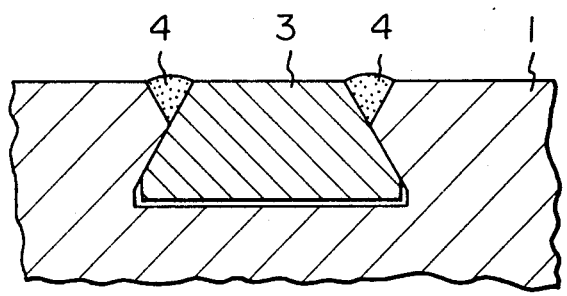
FIG. 2 is a partial sectional view of the stator of FIG. 1.

As illustrated in FIG. 1, a stator of a rotary machine according to the present invention comprises a laminated iron-core 1, end plates 2, and steel bars 3 serving as a frame. The laminated iron-core 1 is formed by laminating a large number of silicon steel plates having a predetermined shape. Each of the silicon steel plates has dovetail grooves formed by punching, as illustrated in FIG. 2. The end plates 2 are made of structural steel or castings and have dovetail grooves of the same shape as the above-mentioned dovetail groove. The steel bars 3 have a trapezoidal cross-section corresponding to the dovetail grooves, so that the bars 3 can be slided and inserted into the dovetail grooves. The trapezoidal shape of the steel bars is an equilateral trapezoid. The edges of the dovetail grooves of the laminated iron-core, i.e., the silicon steel plates, are beveled so as to form V-grooves for welding by the steel bars and the beveled portions of the iron-core when the steel bars 3 are inserted in the dovetail grooves. The steel bars 3 are made of non-magnetic steel, e.g., stainless steel (SUS 304), having a length equal to the sum of the length of the laminated iron-core 1 and the thickness of the two end plates 2.

After the steel bars 3 are inserted in the dovetail grooves of the laminated iron-core 1 and of the end plates 2, the steel bars 3 are welded to the laminated iron-core 1 and to the end plates 2 by forming beads (weld metal) 4 in the V-grooves by a conventional MIG or TIG welding method. Since the inclined planes of the dovetail grooves of the laminated iron-core 1 can suppress the thermal deformation of the steel bars 3 during welding, there is no upward bend of the end portion of the steel bars 3 which is finally welded. If necessary, the beads 4 are ground so as to obtain a smooth surface. In the case of the stator shown in FIG. 1, eight steel bars 3 are used. However, taking the necessary strength for fastening the laminated iron-core into consideration, it is possible to decrease the number of the used steel bars 3. Furthermore, it is possible to automatically carry out the above-mentioned welding.

INDUSTRIAL APPLICABABILITY

With the stator according to the present invention, the laminated iron-core can be fastened with sufficient strength, an electric motor can be made smaller such that the conventional casing may be omitted, and the laminated iron-core can be directly cooled.

We claim:

1. A stator comprising a laminated iron-core with windings, end plates, and a frame formed on the outer periphery of the laminated iron-core, characterized in that said frame comprises steel bars made of a non-magnetic steel and having a trapezoidal shape in cross-section; dovetail grooves which accomodate the steel bars, are formed in said laminated iron-core and edges of said laminated iron-core at said dovetail grooves are beveled to form V-grooves between said laminated iron-core and said steel bars, and said steel bars are welded to said laminated iron-core and to said end plates.

2. A stator according to claim 1, characterized in that said trapezoidal shape is an equilateral trapezoid.

* * * * *